(12) United States Patent
Sekimoto

(10) Patent No.: US 9,543,045 B2
(45) Date of Patent: Jan. 10, 2017

(54) NUCLEAR REACTOR AND POWER GENERATION FACILITY

(75) Inventor: Hiroshi Sekimoto, Tokyo (JP)

(73) Assignee: TOKYO INSTITUTE OF TECHNOLOGY, Tokyo (JP)

( * ) Notice: Subject to any disclaimer, the term of this patent is extended or adjusted under 35 U.S.C. 154(b) by 613 days.

(21) Appl. No.: 13/984,776

(22) PCT Filed: Jan. 18, 2012

(86) PCT No.: PCT/JP2012/050972
§ 371 (c)(1),
(2), (4) Date: Aug. 9, 2013

(87) PCT Pub. No.: WO2012/108238
PCT Pub. Date: Aug. 16, 2012

(65) Prior Publication Data
US 2013/0322588 A1    Dec. 5, 2013

(30) Foreign Application Priority Data

Feb. 10, 2011    (JP) ................................. 2011-027483
Feb. 16, 2011    (JP) ................................. 2011-030850

(51) Int. Cl.
*G21C 7/30*      (2006.01)
*G21C 3/16*      (2006.01)
(Continued)

(52) U.S. Cl.
CPC . *G21C 7/30* (2013.01); *G21C 3/16* (2013.01); *G21C 5/00* (2013.01); *G21C 7/22* (2013.01); *Y02E 30/39* (2013.01)

(58) Field of Classification Search
CPC ............... G21C 7/30; G21C 7/22; G21C 5/00; G21C 3/16
(Continued)

(56) References Cited

U.S. PATENT DOCUMENTS

| 3,600,276 A | * | 8/1971 | Nims | ........................ | G21C 3/12 |
| | | | | | 376/213 |
| 4,943,409 A | * | 7/1990 | Broadley | .................. | G21C 7/30 |
| | | | | | 376/212 |

(Continued)

FOREIGN PATENT DOCUMENTS

| JP | 1-101497 A | 4/1989 |
| JP | 7-43488 A | 2/1995 |

(Continued)

OTHER PUBLICATIONS

Nagata, "A feasible core design of lead bismuth eutectic cooled CANDLE fast reactor", Annals of Nuclear Energy 36 (2009) 532-566.*

(Continued)

*Primary Examiner* — Jack W Keith
*Assistant Examiner* — Daniel Wasil
(74) *Attorney, Agent, or Firm* — Hauptman Ham, LLP

(57) ABSTRACT

A nuclear reactor provided with a core including a new fuel part which contains uranium and a burning part in which fuel burns, wherein the burning part moves in a direction toward the new fuel part from the beginning to end of the operation cycle. The nuclear reactor is provided with a reactivity applying mechanism to apply the reactivity which can change the power of the core when the temperature of the coolant which flows through the inside of the core changes and performs control to change the temperature of the coolant which flows through the inside of the core in accordance with the change of power which is demanded for the core. The reactivity applying mechanism includes a gap adjusting plate which supports fuel members. This plate is configured to expand when the core coolant temperature rises. The expansion increases distance between the fuel members.

6 Claims, 10 Drawing Sheets

(51) Int. Cl.
*G21C 5/00* (2006.01)
*G21C 7/22* (2006.01)

(58) Field of Classification Search
USPC ............... 376/212, 213, 244, 336, 445, 448
See application file for complete search history.

(56) References Cited

U.S. PATENT DOCUMENTS

| | | | | |
|---|---|---|---|---|
| 8,942,338 B2* | 1/2015 | Ahlfeld | ................... | G21C 5/20 |
| | | | | 376/220 |
| 2008/0123797 A1* | 5/2008 | Hyde | ................... | G21C 7/00 |
| | | | | 376/348 |
| 2010/0266088 A1* | 10/2010 | Ahlfeld | ................... | G21C 7/32 |
| | | | | 376/244 |
| 2011/0110479 A1* | 5/2011 | Ahlfeld | ................... | G21C 7/30 |
| | | | | 376/220 |

FOREIGN PATENT DOCUMENTS

| | | |
|---|---|---|
| JP | 2002-71866 A | 3/2002 |
| JP | 3463100 B2 | 11/2003 |
| JP | 2007-232429 A | 9/2007 |

OTHER PUBLICATIONS

Ismail, "Long life small CANDLE-HTGRs with thorium", Annals of Nuclear Energy 34,(2007) 120-129.*
Corresponding PCT/JP2012/050972 International Search Report dated Mar. 19, 2012.
G.L. Khorasanov et. al., "Minimization of an initial fast reactor uranium-plutonium load by using enriched lead-208 as a coolant", Nuclear Engineering and Design 239 (2009), pp. 1703-1707.

* cited by examiner

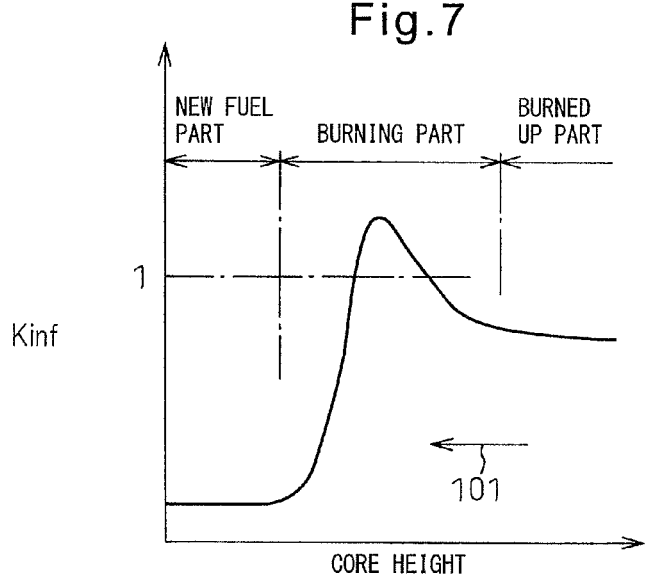
Fig.7
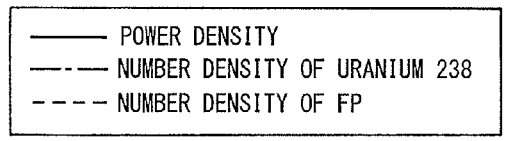
Fig.8
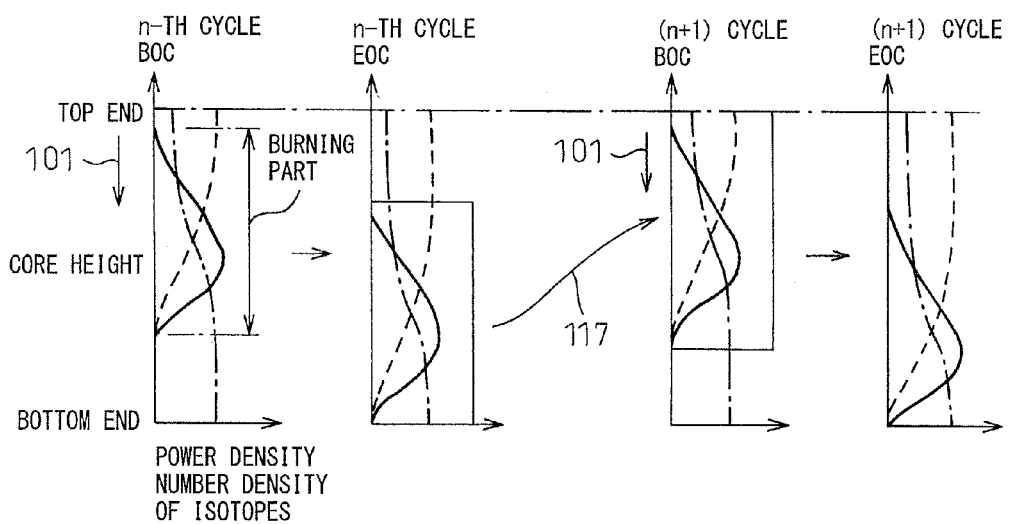

NUCLEAR REACTOR AND POWER GENERATION FACILITY

RELATED APPLICATIONS

The present application is a National Phase of International Application Number PCT/EP2012/051958, filed, Feb. 6, 2012, and claims priority from, Italian Application Number MI2011A000200, filed Feb. 11, 2011.

TECHNICAL FIELD

The present invention relates to a nuclear reactor and a power generating facility.

BACKGROUND ART

Nuclear reactors are used for electric power generating facilities. Nuclear reactors include fast neutron reactors. Fast neutron reactors are nuclear reactors which mainly use fast neutrons to cause fission of fissionable nuclides to generate power. Sodium, lead-bismuth alloys, and other heavy metals and, further, gas are used to cool the core. In nuclear reactors of the prior art, fission occurs at the core as a whole to generate power.

The criticality of the core of a nuclear reactor is maintained and the output is adjusted by for example control rods. The control rods are formed by a material which easily absorbs neutrons. At the start of an operation cycle, when inserting control rods into the core, along with the progress in burning, the control rods are gradually withdrawn so as to maintain the critical state while maintaining output. In this way, in operation of a nuclear reactor, control is necessary for maintaining the criticality of the nuclear reactor. Control is performed for maintaining the criticality on a continuous basis from the start of the operation cycle to the end of the operation cycle.

Japanese Patent No. 3463100 discloses a nuclear reactor in which control for maintaining the criticality in the operation cycle is unnecessary. This nuclear reactor employs the burning method called CANDLE (Constant Axial Shape of Neutron Flux, Nuclide Densities and Power Shape During Life of Energy Production) burning. In CANDLE burning, the core can be divided into a generally new fuel part, burning part, and burned up part. The burning part moves toward the new fuel part by a speed proportional to output along with burning. In CANDLE burning, after a single operation cycle is ended, fuel is replaced for the next operation cycle. When replacing the fuel, the burned up fuel can be taken out in the core axial direction and new fuel can be loaded in the end at the opposite side to the end at the taken out side.

In CANDLE burning, there is no need for adjustment of criticality. Further, even if not adjusting the power density distribution, the power density distribution is maintained substantially constant. For this reason, there is the feature that from the beginning to the end of the operation cycle, there is no need for control of the reactivity of the core such as manipulation of the control rods. Further, there is the feature that the reactivity coefficient does not change and it is not necessary to change the method of operation together with burning.

CITATION LIST

Patent Literature

PLT 1: Japanese Patent No. 3463100

SUMMARY OF INVENTION

Technical Problem

By employing CANDLE burning as the method of burning fuel at a nuclear reactor, it is possible to provide a nuclear reactor in which the core properties can be maintained substantially constant even when burning progresses, control of the operation becomes simple, and the probability of accidents is low. Further, there is no need to arrange control rods in the core, so there is no possibility of accidents where the control rods are mistakenly pulled out during the operating period. Further, the burn-up when taking out the fuel is high, so it is possible to reduce the amount of waste.

In CANDLE burning, as the new fuel for the second cycle and on, it is possible to use natural uranium or depleted uranium alone for operation. These fuels are subcritical, so are easy to transport and store. Further, it is possible to utilize about 40% of the uranium as energy without enrichment or reprocessing, so resources can be effectively utilized. Further, since the new fuel of the second cycle and on does not require enrichment, reprocessing, etc., there is the feature of a high prevention of proliferation of nuclear weapons.

A nuclear reactor is arranged in a power generating facility, ship, etc. A nuclear reactor is sometimes changed in power in accordance with the amount of heat which is required during its operating period. For example, in a power generating facility, the power of the core is changed in accordance with the generated electric power. In a nuclear reactor of the conventional art, for example, control rods are inserted into and withdrawn from the inside of the core so as to control the power of the core.

Even in a nuclear reactor which is provided with a core which employs CANDLE burning, it is possible to arrange control rods which are inserted in the core so as to adjust the power of the core. However, in CANDLE burning, if forming channels for insertion of control rods in the core, sometimes it is difficult to achieve criticality. In the core in the prior art, it was possible to increase the concentration of fissionable uranium or the concentration of plutonium or increase the number of fuel assemblies of new fuel so as to easily achieve criticality. In CANDLE burning as well, concentrated uranium etc. can be included in new fuel, but it is preferable to not use concentrated uranium etc. but to use only natural uranium or depleted uranium as new fuel.

Further, to uniformly burn fuel, it is preferable that the power density distribution in the radial direction be substantially constant. In this regard, if forming channels for insertion of control rods in the core, spaces in which fuel is not loaded are formed in the core. The problem arises that in these spaces, the power density ends up becoming smaller and the power density distribution in the radial direction becomes uneven.

The present invention has as its object the provision of a nuclear reactor which is provided with a core in which the burning part moves toward the new fuel part along with burning of fuel and which can adjust the power even without using control rods and a power generating facility which is provided with such a nuclear reactor.

Solution to Problem

The nuclear reactor of the present invention is provided with a core which is provided with a new fuel part at which new fuel is loaded and a burning part which is arranged at one side of the new fuel part and which generates neutrons to enable the fuel to burn, wherein the new fuel includes at least one type of uranium from among natural uranium and depleted uranium, the uranium absorbs neutrons to generate plutonium which fissions to generate power, and the burning part moves in a direction toward the new fuel part while maintaining a substantially constant shape from the beginning to end of the operation cycle. The nuclear reactor is provided with a reactivity applying mechanism to apply the reactivity which can change the power of the core when the temperature of the coolant which flows through the inside of the core changes, and the power of the core is adjusted by performing control to change the temperature of the coolant which flows through the inside of the core in accordance with the change of power which is demanded for the core.

In the above invention, preferably the reactivity applying mechanism includes fuel members which include fuel rods or fuel assemblies and a gap adjusting member which is arranged in a region which is included in a burning part at the beginning of an operation cycle, supports a plurality of fuel members together, and determines the distance between the fuel members, the gap adjusting member is formed by a material which expands when the temperature rises, and the gap adjusting member expands and the distance between fuel members become larger when the temperature of the coolant in the core rises.

In the above invention, preferably the core has a high rise rate region where the temperature of the coolant rises from a core inlet toward a core outlet and a low rise rate region which is arranged downstream from the high rise rate region and has a smaller rate of rise of temperature than the high rise rate region, and the gap adjusting member is arranged in the low rise rate region at the beginning of the operation cycle.

In the above invention, preferably the gap adjusting member includes a gap adjusting plate which has holes, and a plurality of fuel members are supported in the holes.

In the above invention, preferably the reactor changes the temperature of the coolant which flows inside the core by performing a coolant temperature adjustment control which makes the temperature of the coolant which flows into the core change.

In the above invention, preferably the nuclear reactor is formed so that when the flow rate of the coolant which flows into the core changes, the temperature of the coolant which flows through the inside of the core changes and the reactivity which can change the power of the core is applied, and the reactor changes the temperature of the coolant which flows inside the core by performing a coolant flow rate adjustment control which makes the flow rate of the coolant which flows into the core change.

In the above invention, preferably the coolant is mainly comprised of lead 208 among the isotopes of lead.

The power generating facility of the present invention is provided with the above nuclear reactor, a steam generator which generates steam by heat which is generated by the core, a turbine which turns by the supply of steam which is produced by the steam generator, and a generator which is connected to the turbine.

Advantageous Effects of Invention

According to the present invention, it is possible to provide a nuclear reactor which is provided with a core which burns fuel and in which the burning part moves toward the new fuel part and which adjusts the power without using control rods and a power generating facility which is provided with this nuclear reactor.

BRIEF DESCRIPTION OF DRAWINGS

FIG. 7 is a graph which explains the relationship between the core height and the infinite neutron multiplication factor of fuel.

FIG. 8 is a view which explains a change in power density of the core and replacement of fuel in the Embodiment 1.

DESCRIPTION OF EMBODIMENTS

Embodiment 1

Referring to FIG. 1 to FIG. 13, the nuclear reactor and power generating facility in the Embodiment 1 will be explained. The core of the nuclear reactor in the present embodiment is a fast neutron reactor which can use fast neutrons to cause fission of plutonium. The nuclear reactor in the present embodiment is arranged in a power generating facility and generates electric power by the heat of the coolant which flows out from the nuclear reactor.

Figure 1:
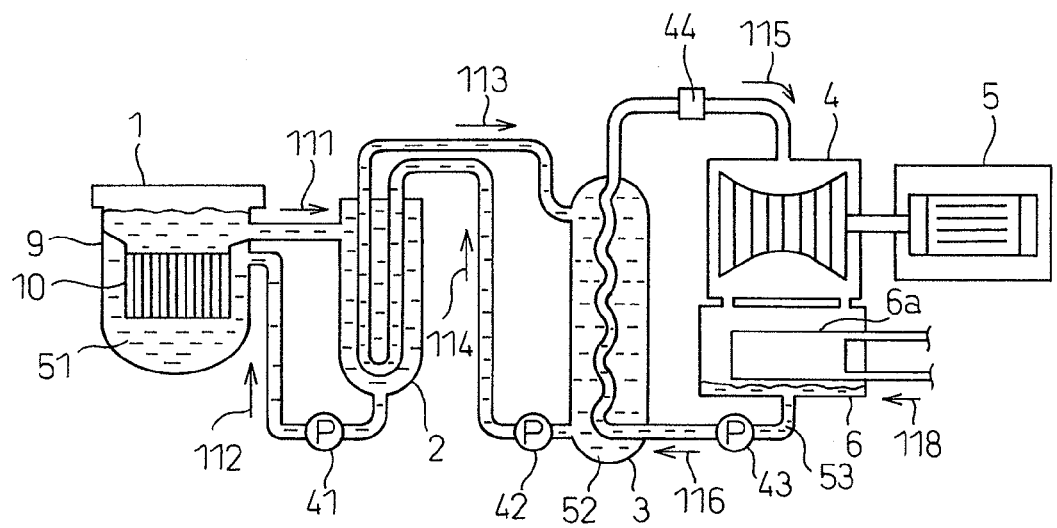
FIG. 1 is a schematic view of a power generating facility in Embodiment 1.

FIG. 1 is a schematic view of a power generating facility in the present embodiment. The electric power generating facility in the present embodiment is provided with a nuclear reactor 1. The nuclear reactor 1 includes a reactor vessel 9 and a core 10 which is arranged at the inside of the reactor vessel 9. The core 10 is loaded with fuel. In the core 10 in the present embodiment, the vertical direction corresponds to the axial direction of the core. Inside of the nuclear reactor 1, coolant is supplied. By the coolant flowing through the inside of the core 10, the heat of the core 10 is transmitted to the coolant.

For the coolant in the present embodiment, it is possible to use a material with a small ability to decelerate neutrons and a small ability to absorb neutrons. In the present embodiment, liquid sodium 51 is used as the coolant. As the coolant of the nuclear reactor, in addition to a sodium coolant, it is possible to use a lead-bismuth coolant or other lead-based coolant, helium or another gas coolant, etc. Further, in the present embodiment, liquid sodium 52 is used even as a heat medium which transfers heat from the intermediate heat exchanger 2 to the steam generator 3.

The power generating facility is provided with an intermediate heat exchanger 2 and steam generator 3 which use the heat of the coolant which flows through the core 10 to generate steam which turns the turbine 4. The heat of the coolant is transmitted through the intermediate heat exchanger 2 to the steam generator 3.

By driving a pump 41, the primary system sodium 51 which functions as the coolant, as shown by the arrow 112, flows into the inside of the reactor vessel 9. The coolant circulates through the inside of the core 10 whereby the temperature rises. The coolant which is raised in temperature, as shown by the arrow 111, is sent to the intermediate heat exchanger 2. The coolant exchanges heat by the intermediate heat exchanger 2, then is supplied by the pump 41 to the inside of the reactor vessel 9.

The secondary system sodium 52 which transfers heat from the intermediate heat exchanger 2 to the steam generator 3, as shown by the arrow 114, is supplied to the intermediate heat exchanger 2 by driving the pump 42. The secondary system sodium 52 exchanges heat with the coolant whereby the temperature rises. The secondary system sodium 52 which is raised in temperature, as shown by the arrow 113, is supplied to the steam generator 3.

The steam generator 3 in the present embodiment heats water 53 by the heat of the secondary system sodium 52. By driving the pump 43, as shown by the arrow 116, water is supplied to the steam generator 3. In the steam generator 3, the secondary system sodium 52 and water exchange heat whereby steam is generated. The secondary system sodium 52 which performs heat exchange in the steam generator 3 is supplied by the pump 42 to the intermediate heat exchanger 2.

The power generating facility in the present embodiment is provided with a turbine 4 and a generator 5. The steam which is generated by the steam generator 3 passes through a flow regulating valve 44 and, as shown by the arrow 115, is supplied to the turbine 4. By adjusting the opening degree of the flow regulating valve 44, it is possible to adjust the flow rate of steam which is supplied to the turbine. The steam makes the turbine 4 turn. The rotational force of the turbine 4 is transmitted to the generator 5 whereby the generator 5 generates power.

The steam and condensed water which flow out from the turbine 4 flow into the condenser 6. The condenser 6 includes a heat exchanger 6a. The heat exchanger 6a, as shown by the arrow 118, is supplied with seawater or other cooling water. The steam is returned to water 53 in the condenser 6. The water 53 which flows out from the condenser 6 is supplied by the pump 43 to the steam generator 3.

Figure 2:
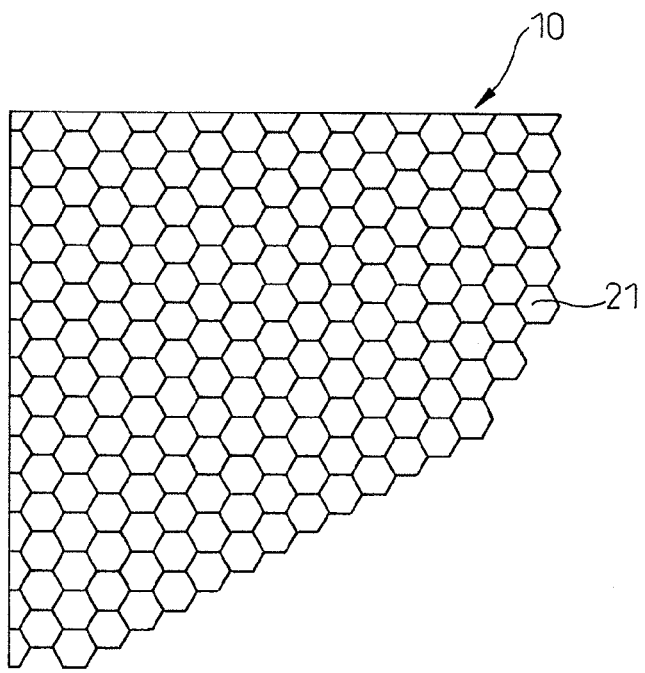
FIG. 2 is a schematic plan view of one-quarter of a core in the Embodiment 1.

FIG. 2 is a schematic plan view of the core of a nuclear reactor in the present embodiment. FIG. 2 shows one-quarter of the core. The core 10 in the present embodiment is formed so as to become substantially hexagonal in plan view. The core of the nuclear reactor is not limited to this. It may be formed into any geometric shape or circular shape becoming substantially circular when seen by a plan view.

The core 10 in the present embodiment includes fuel assemblies 21 as fuel members. In the present embodiment, the plurality of fuel assemblies 21 are regularly arranged. The plurality of fuel assemblies 21 in the present embodiment are loaded with the same new fuel. In the present embodiment, depleted uranium is loaded as new fuel. In the present embodiment, no reflecting material is arranged around the core 10, but the invention is not limited to this. A reflecting material may also be arranged around the core 10.

Figure 3:
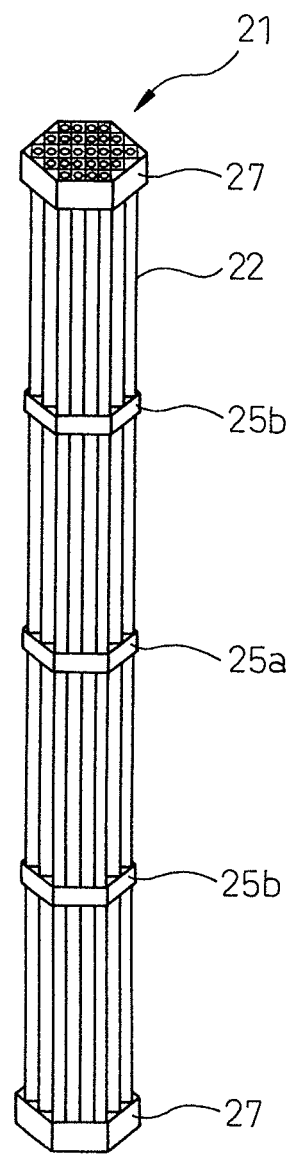
FIG. 3 is a schematic perspective view of a fuel assembly in the Embodiment 1.

FIG. 3 is a schematic perspective view of a fuel assembly in the present embodiment. Each fuel assembly 21 includes a plurality of fuel rods 22. The fuel rods 22 are supported by nozzles 27 at their longitudinal direction ends. Alternatively, the fuel rods 22 are supported by fastening members which are arranged inside of the fuel assemblies 21 and are fastened to the nozzles 27. Further, the fuel rods 22 are supported by a plurality of support grids 25a and 25b. The support grids 25a and 25b support the fuel rods 22 to be separated from each other. The coolant flows between the fuel rods 22 and cools the fuel rods 22. In the present embodiment, the support grids are used to maintain the distance between the fuel rods, but the invention is not limited to this. Instead of support grids, it is also possible to use wire spacers etc.

Figure 4:
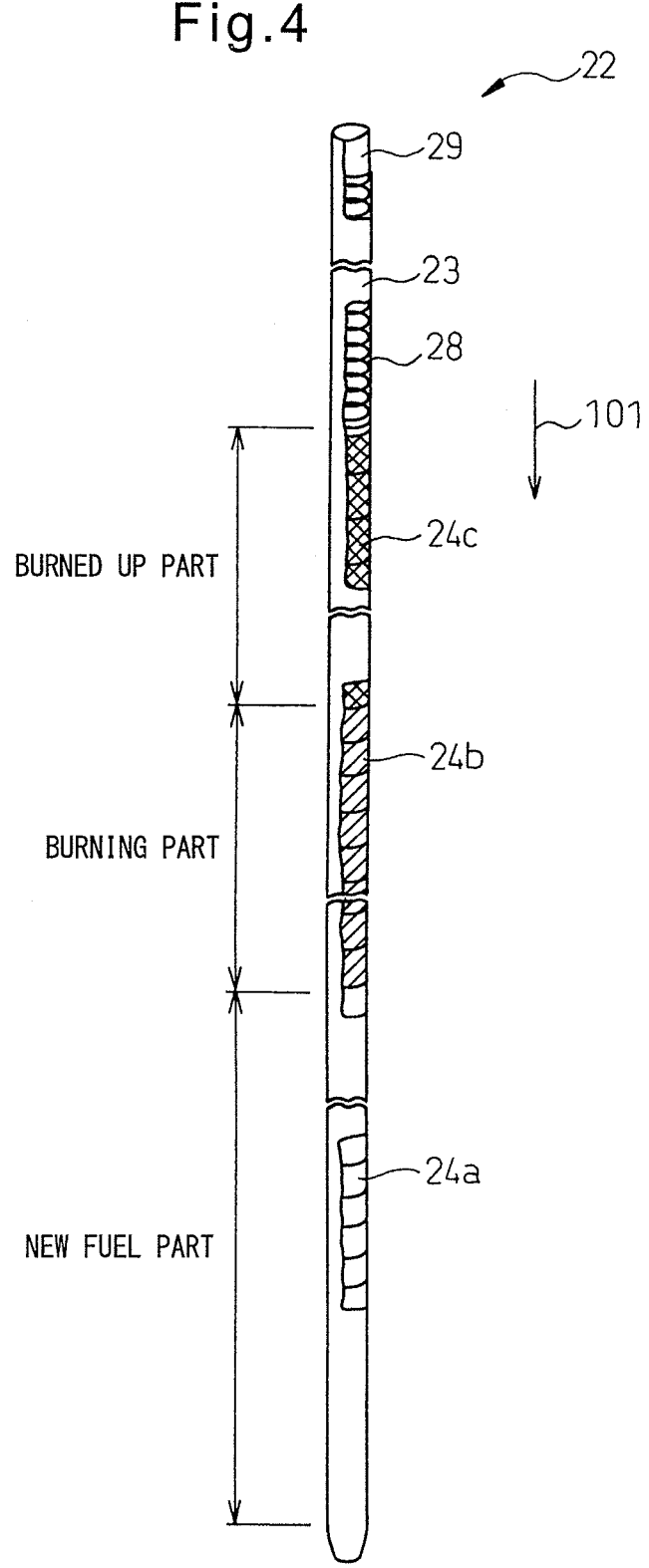
FIG. 4 is a schematic perspective view of a fuel rod in the Embodiment 1.

FIG. 4 is a schematic perspective view of a fuel rod in the present embodiment. FIG. 4 shows a fuel rod which burns from the top side toward the bottom side. Part of the cladding material is shown cut away. The fuel rod 22 in the present embodiment includes a cladding material 23. The cladding material 23 is formed in a tubular shape. The cladding material 23 is, for example, formed by stainless steel. The fuel rod 22 contains fuel pellets 24a, 24b, and 24c. The fuel pellets 24a, 24b, and 24c are arranged inside the cladding material 23. The fuel rod 22 is sealed by a cap 29. The fuel pellets 24a, 24b, and 24c are pushed down by a coil spring 28.

The fuel rod shown in FIG. 4 shows the state at the beginning of an operation cycle. A plurality of fuel pellets 24a, 24b, and 24c are arranged in the order of fuel pellets 24a containing new fuel, fuel pellets 24b in the middle of burning, and fuel pellets 24c fully burned up. The new fuel part of the core is defined by the part of the fuel pellets 24a containing new fuel. The burning part of the core is defined by the part of the fuel pellets 24b in the middle of burning. The burned up part of the core is defined by burned up fuel pellets 24c.

In this way, in the fuel rod 22 in the present embodiment, fuel pellets 24a, 24b, 24c of different burn-ups are arranged. After the end of one operation cycle, for example, the cladding material 23 is stripped off and the fuel pellets of the burned up part are separated from the other fuel pellets. Next, fuel pellets containing new fuel and the recovered fuel pellets are arranged inside a new cladding material, whereby it is possible to form a fuel rod for the next operation cycle.

Further, as the method of recovering fuel pellets, it is also possible to cut the fuel rod at each part, then strip off the cladding material 23. This method may also be used to recover fuel pellets which were arranged at the burning part and burned up part.

Referring to FIG. 2 to FIG. 4, the fuel pellets which are arranged in the new fuel part of the fuel assemblies 21 in the present embodiment include depleted uranium. The fuel in the present embodiment is a metal fuel, but the invention is not limited to this. For example, it is also possible to use a nitride fuel etc.

Next, power operation of the core in the present embodiment will be explained. In the present embodiment, an example where the power is maintained substantially constant during power operation will be explained.

Figure 5:
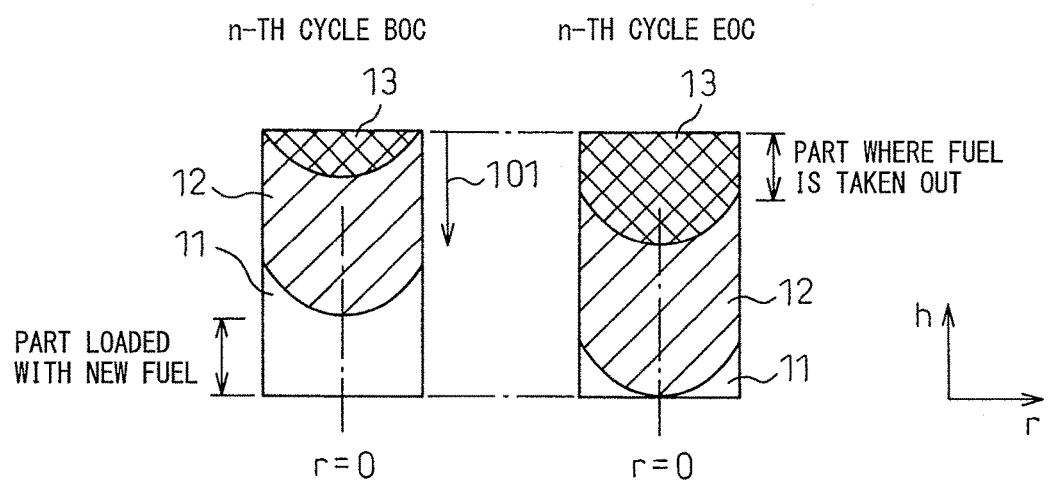
FIG. 5 is a schematic view which explains a burning state of fuel of the core in the Embodiment 1.

FIG. 5 is a schematic view for explaining the state of progress of burning of the core in the present embodiment. FIG. 5 is a schematic cross-sectional view when cutting the core along the axial direction. FIG. 5 shows a core at the beginning (BOC) of the n-th cycle and a core of the end of (EOC) of the n-th cycle after a plurality of operation cycles. Further, it shows a core after a plurality of cycles of operation by the same cycle length and same fuel replacement method. The axis where the position "r" in the radial direction is zero is the core axis.

In the core 10 of the nuclear reactor in the present embodiment, the burning part 12 moves toward the new fuel part 11 from the beginning to end of the operation cycle. That is, the core of the present embodiment performs CANDLE burning. The velocity of movement of the burning part 12 is roughly proportional to the power density and is inversely proportional to the fuel atomic number density.

The power density of the core in the present embodiment becomes higher at the center of the core. At the outer circumference of the core, the leakage of neutrons becomes greater, so the power density becomes smaller the further toward the outside in the radial direction. For this reason, the position of the burning part in the axial direction is a position delayed further the more to the outside in the radial direction.

The core 10 in the present embodiment includes the new fuel part 11, burning part 12, and burned up part 13. The new fuel part 11 is the part at which new fuel is arranged. The burning part 12 is a part at which neutrons are produced and the fuel burns. At the burning part 12, fission occurs whereby output is substantially produced. The burned up part 13 is a part which has burned up and almost no power is being produced.

At the core at the beginning of the n-th cycle, the new fuel part 11 is arranged at the bottom part of the core 10. The burning part 12 is arranged at the upper side of the new fuel part 11. At the burning part 12, fuel which already began burning at the previous cycle is arranged.

In the present embodiment, the burning part 12 which is arranged at the beginning of cycle becomes the part where the burning is started. The fuel starts to burn from the burning part 12 and, as shown by the arrow 101, proceeds to burn in a direction toward the new fuel part 11. When the burning of the n-th cycle proceeds and the end of cycle is reached, the burning part 12 proceeds down to the bottom end of the core 10. In the present embodiment, the burning is continued until the new fuel part 11 is consumed. At the end of the operation cycle, the new fuel part 11 may remain.

Figure 6:
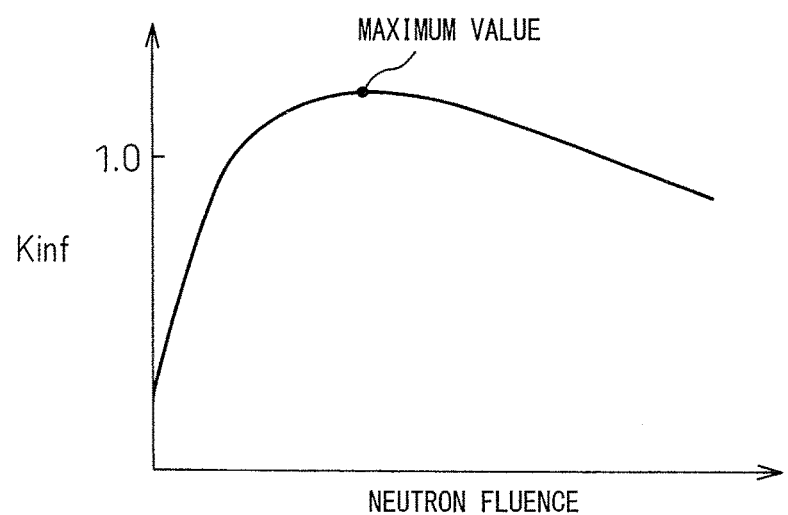
FIG. 6 is a graph explaining the change in the infinite neutron multiplication factor with respect to the neutron fluence of fuel in the Embodiment 1.

FIG. 6 is a graph which explains the relationship between the neutron fluence of fuel and infinite neutron multiplication factor in the present embodiment. The abscissa indicates the neutron fluence obtained by integrating the neutron flux over time, while the ordinate indicates the infinite neutron multiplication factor kinf. The neutron fluence is a quantity corresponding to the burnup of fuel for example. In the present embodiment, depleted uranium is used as fuel. Depleted uranium contains about 99.8% of uranium 238 and about 0.2% of uranium 235. Uranium 238 absorbs neutrons whereby nuclear transformation occurs as shown in the following formula 1. Uranium 238 is transformed to plutonium 239.

(Formula 1)

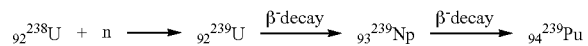

In the vicinity of zero neutron fluence, uranium 238 absorbs neutrons whereby plutonium 239 is produced. Due to this, the infinite neutron multiplication factor rises. When reaching a predetermined neutron fluence, the ratio of the amount of plutonium 239 etc. to the amount of uranium 238 approaches a constant one, the fission products (FP) build up, and the infinite neutron multiplication factor is gradually reduced. In this way, the fuel in the present embodiment has the property that the infinite neutron multiplication factor increases at the beginning of burning and then the infinite neutron multiplication factor gradually decreases after that.

Further, the subcriticality of depleted uranium is large, so to make part of the core critical or more, a large amount of neutrons have to be made to be absorbed at the uranium 238. In the present embodiment, the core size is selected and the fuel assemblies and fuel rods are designed so as to satisfy these conditions.

By employing such a core configuration, it is possible to perform CANDLE burning. That is, it is possible to form a core wherein output is produced over the entire radial direction of the core and wherein a burning part is formed in part of the region in the axial direction of the core.

FIG. 7 shows a graph of the infinite neutron multiplication factor when burning fuel by an infinite core height. The abscissa indicates the core height, while the ordinate indicates the infinite neutron multiplication factor of fuel. In the present embodiment, as shown by the arrow 101, the burning part moves toward the new fuel part. The burning part includes a region with an infinite neutron multiplication factor of over 1. The height of a core of an actual nuclear reactor is finite. In this case, the infinite neutron multiplication factor at the end of the core is slightly off from the graph shown in FIG. 7.

FIG. 8 is a graph which explains the state of progress of burning of the core and fuel replacement in the present embodiment. FIG. 8 shows a graph of a core at the beginning and end of the n-th cycle and a graph of a core at the beginning and end of the (n+1)th cycle. In the graphs, the power density at the core axis, the number density of uranium 238, and the number density of fission products are shown.

Referring to FIG. 7 and FIG. 8, the maximum point of the power density, as shown by the arrow 101, moves toward the bottom of the core where the new fuel part 11 is arranged. The burning part in the present embodiment moves in a direction from the top end to the bottom end of the core. The velocity at which the burning part moves, that is, the velocity at which the maximum point of the power density moves, is, for example, several cm a year. In this way, the burning part slowing moves. The number density of uranium 238 is made smaller at the downstream side of the burning part due to nuclear transformation. Further, the number density of the fission products becomes larger at the downstream side of the burning part due to fission. In the present embodiment, the fuel finishes burning when the burning part reaches the substantial bottom end of the core.

If the n-th cycle ends, the fuel of part of the burned up part is taken out. At the core at the beginning of the (n+1)th cycle, as shown by the arrow 117, the burning part which is arranged at the bottom part of the core at the n-th cycle is arranged at the top part of the core and is used as the part for starting burning. At the core at the (n+1)th cycle, a new fuel part 11 is newly arranged at the bottom of the core. By replacing the fuel in this way, it is possible to burn fuel in the same way as the n-th cycle in the core at the (n+1)th cycle as well.

Figure 9:
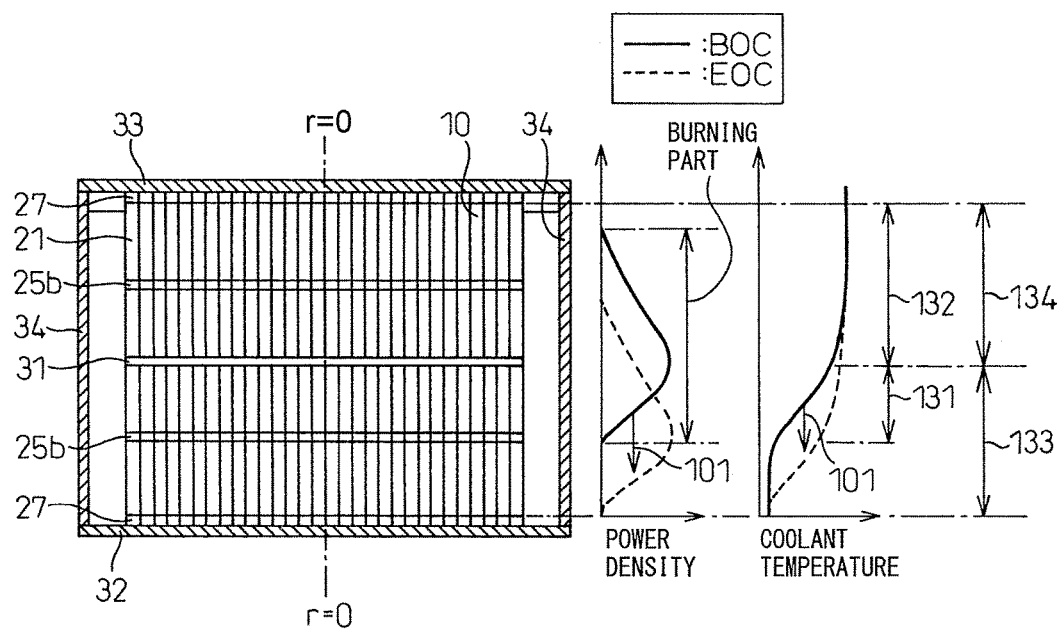
FIG. 9 is a schematic partial cross-sectional view of the core in the Embodiment 1.

FIG. 9 is a schematic partial cross-sectional view of a core in the present embodiment. In the present embodiment, the core 10 is arranged at the inside of the baffle plate 34. The fuel assemblies 21 are arranged so that their longitudinal directions become substantially parallel to the axial direction of the core 10. The nuclear reactor 1 in the present embodiment is provided with a reactivity applying mechanism to apply the reactivity which can change the power of the core 10 when the temperature of the coolant which flows through the inside of the core changes.

At the bottom end of the core 10, an assembly bottom end support member 32 is arranged. The bottom ends of the fuel assemblies 21 are fastened to the assembly bottom end support member 32. The assembly bottom end support member 32 need only fasten the fuel assemblies 21, so it is possible to employ a material excellent as a structural member. At the top end part of the core 10, an assembly top end support member 33 is arranged. The assembly top end support member 33 is formed so as to support the top ends of the fuel assemblies 21 in a movable manner. The top ends of the fuel assemblies 21 are supported by the assembly top end support member 33 to be able to move toward the outside.

The core in the present embodiment 10 is provided with a gap adjusting plate 31 serving as a gap adjusting member which supports the plurality of fuel assemblies 21. The gap adjusting plate 31 is arranged at the part of the support grids 25a among the plurality of support grids 25a and 25b (see FIG. 3). At the part where the gap adjusting plate 31 is not arranged, a clearance is formed between the support grids 25b of the adjoining fuel assemblies 21.

Figure 10:
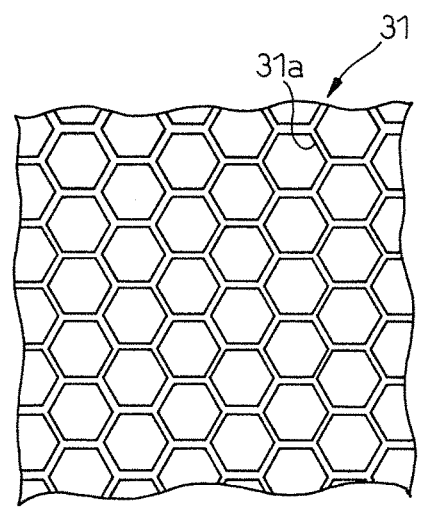
FIG. 10 is an enlarged schematic plan view of a gap adjusting member in the Embodiment 1.

FIG. 10 is a schematic plan view of a gap adjusting plate in the present embodiment. Referring to FIG. 9 and FIG. 10, the gap adjusting plate 31 has holes 31a in which the fuel assemblies 21 are inserted. The holes 31a of the gap adjusting plate 31 are formed so as to match with the support grids 25a of the fuel assemblies 21. The gap adjusting plate 31 in the present embodiment is formed so as to support all fuel assemblies 21 which are contained in the core 10. By arranging the support grids 25a of the fuel assemblies 21 at the holes 31a, the adjoining fuel assemblies 21 can be constrained with respect to each other. The gap between the plurality of fuel assemblies 21 is set.

In the present embodiment, the gap adjusting plate 31 is formed by a material which expands when the temperature rises. The gap adjusting plate 31 is formed by a material with a large coefficient of thermal expansion. Further, the gap adjusting plate 31 in the present embodiment is formed by a material with a higher coefficient of thermal expansion than the assembly bottom end support member 32. As a material with a large coefficient of thermal expansion, stainless steel may be illustrated. For example, stainless steel SUS304 which contains nickel in 8 to 10.5% and chromium in 18 to 20% (based on Japanese Industrial Standard (JIS)) or stainless steel SUS316 which contains nickel in 10 to 14%, chromium in 16 to 18%, and molybdenum in 2 to 3% (based on Japanese Industrial Standard (JIS)) may be employed.

FIG. 9 shows the power density and the coolant temperature in the axial direction of the core in addition to a schematic view of the core. The solid lines show the state at the beginning of the operation cycle (BOC), while the broken lines show the state at the end of the operation cycle (EOC). The distribution of the power density and the distribution of the coolant temperature move toward the bottom end of the core from the beginning to end of the operation cycle as shown by the arrows 101. The temperature of the coolant rises from the bottom end to the top end of the core 10.

In the present embodiment, the gap adjusting plate 31 is arranged in the region of the burning part at the beginning of the operation cycle. In particular, in the present embodiment, it is arranged at the region of the burning part throughout the operation cycle. That is, the gap adjusting plate 31 is arranged at the inside of the region of the burning part both at the beginning and at the end of the operation cycle. The gap adjusting plate 31 is arranged at a region where the temperature of the coolant becomes high throughout the period of the operation cycle.

Furthermore, the gap adjusting plate 31 in the present embodiment is arranged at a position in the axial direction of the core where the power density becomes substantially maximum at the beginning of the operation cycle. Alternatively, the gap adjusting plate 31 in the present embodiment is arranged at a position where the rise in the temperature of the coolant becomes gentle in the direction from the core inlet to the core outlet at the beginning of the operation cycle.

Figure 11:
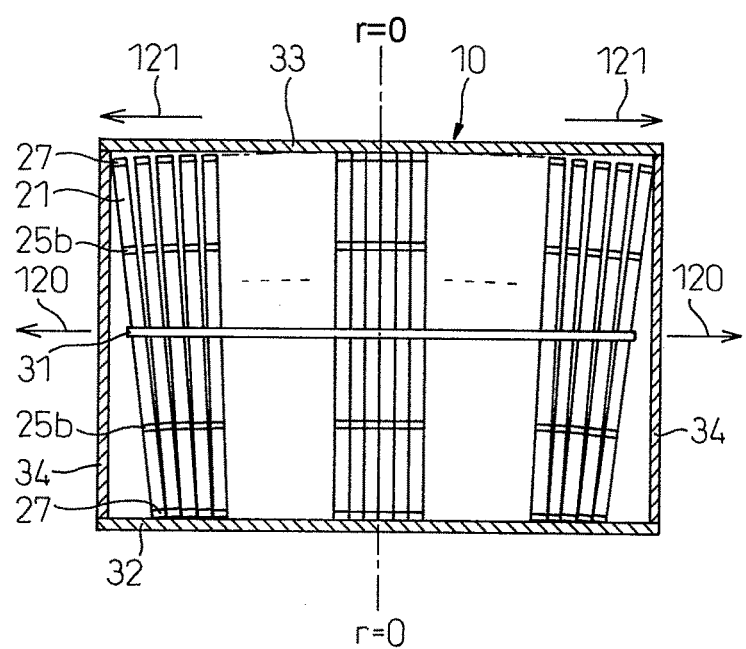
FIG. 11 is another schematic partial cross-sectional view of the core in the Embodiment 1.

FIG. 11 is another schematic partial cross-sectional view of the core in the present embodiment. At the core 10, the coolant contacts the gap adjusting plate 31. For this reason, along with the rise of the temperature of the coolant, the temperature of the gap adjusting plate 31 also rises. The gap adjusting plate 31 expands toward the outside in the radial direction as shown by the arrows 120 when the temperature rises.

The fuel assemblies 21 are constrained by the gap adjusting plate 31. Further, in the core 10 of the present embodiment, the bottom ends of the fuel assemblies 21 are fastened to the assembly bottom end support member 32. If the gap adjusting plate 31 expands, as shown by the arrows 121, the top ends of the fuel assemblies 21 head to the outside in the radial direction. The distances of movement of the top ends of the fuel assemblies 21 gradually increase the more to the outside of the radial direction about the core axis (r=0).

In this way, when the temperature of the coolant rises, the distance between the fuel assemblies 21 increases, so the leakage of neutrons increases. The effective neutron multiplication factor of the core 10 can be made less than 1 and the reactivity which is applied to the core 10 can be made negative. That is, in the core 10 in the present embodiment 10, a negative reactivity is applied when the temperature of the coolant rises.

Further, when the temperature of the coolant falls, the distance between fuel assemblies 21 becomes smaller, so the leakage of neutrons becomes smaller. The core 10 is given a positive reactivity. In this way, the core in the present embodiment 10 can be applied a negative temperature coefficient relating to the coolant.

The temperature coefficient of the fuel easily becomes a negative value due to the Doppler effect, but the absolute value is small. The temperature coefficient relating to the coolant in the present embodiment can be made negative value which has a large absolute value. The temperature coefficient relating to the coolant of the present embodiment can be made a negative value much larger than the temperature coefficient of the fuel. For this reason, even if the temperature coefficient of the other structural members etc. is positive, the temperature coefficient of the core as a whole easily becomes negative.

Further, in the core in the present embodiment, the shape of the core is changed to make the temperature coefficient relating to the coolant more negative, but even with a large-sized core with a large number of fuel assemblies, the temperature coefficient relating to the coolant can be made negative.

Referring to FIG. 9, the gap adjusting plate 31 in the present embodiment is arranged in the region which is included in the burning part at the beginning of the operation cycle. Due to this configuration, when the power and the coolant flow rate etc. change and the temperature of the coolant changes, it is possible to arrange the gap adjusting plate 31 in the region with a large extent of change of the temperature of the coolant and increase the amount of expansion of the gap adjusting plate 31. The distance between fuel assemblies 21 when the gap adjusting plate 31 expands can be enlarged and the temperature coefficient relating to the coolant can be made a more negative value.

For example, when arranging the gap adjusting plate 31 near the bottom end of the core 10, the gap adjusting plate 31 is arranged at the outside of the burning part at the beginning of the operation cycle. Near the bottom end of the core 10, heat due to nuclear fission is not transferred to the coolant, so the extent of change of the temperature of the coolant becomes smaller. For this reason, the gap adjusting plate 31 cannot be made to sufficiently expand. By arranging the gap adjusting plate 31 in the region of the burning part like in the present embodiment, the gap adjusting plate 31 can be arranged in the region with a relatively high temperature of the coolant. In this region, the extent of change of the temperature of the coolant becomes larger, so the gap adjusting plate 31 can be made to greatly expand. The temperature coefficient relating to the coolant can be made a more negative value.

Further, by arranging the gap adjusting plate 31 in the region of the burning part, the extent of temperature change of the coolant becomes larger, so the speed of change of the volume of the gap adjusting plate 31 becomes faster. It is possible to increase or reduce the distance between fuel assemblies 21 with a good response while tracking changes in the temperature of the coolant. That is, the reaction speed of the reactivity with respect to changes in the temperature of the coolant can be improved.

Furthermore, the gap adjusting plate 31 in the present embodiment is arranged at a position in the axial direction of the core where the coolant temperature becomes a value close to the coolant temperature at the core outlet at the beginning of the operation cycle. The coolant temperature greatly rises from the core inlet to the core outlet mainly in the region where the power density of the burning part becomes high. Referring to FIG. 9, the core has a high rise rate region 131 where the temperature of the coolant rises from the core inlet toward the core outlet and a low rise rate region 132 where the rate of rise of temperature becomes smaller than the high rise rate region 131. The low rise rate region 132 is arranged downstream from the high rise rate region 131. FIG. 9 shows the high rise rate region 131 and the low rise rate region 132 at the beginning of the operation cycle.

The gap adjusting plate 31 in the present embodiment is arranged at the low rise rate region 132 where the temperature of the coolant rises gently at the beginning of the operation cycle. By employing this configuration, it is possible to arrange the gap adjusting plate 31 in the low rise rate region 132 from the beginning to end of the operation cycle. Even if the burning part moves during the period of the operation cycle, the coolant temperature at the gap adjusting plate 31 does not change that much and the amount of expansion does not change either. For this reason, it is possible to suppress changes in the effective neutron multiplication factor accompanying burning of fuel and possible to realize ideal CANDLE burning. Further, it is possible to reduce the change in temperature coefficient relating to the coolant accompanying burning of fuel.

Furthermore, the gap adjusting plate 31 is preferably arranged at a position near to the assembly bottom end support member 32 where the distance between fuel assemblies 21 does not change in the range where the coolant temperature becomes a value close to the coolant temperature at the core outlet. In the present embodiment, it is preferably arranged at a position near the core inlet. For example, the gap adjusting plate 31 is preferably arranged at the core inlet side end of the low rise rate region 132 at the beginning of the operation cycle. By adopting this configuration, the distance between fuel assemblies can be increased when the gap adjusting plate 31 expands and the temperature coefficient relating to the coolant can be made a more negative value. Note that, the position of the gap adjusting plate 31 is not limited to this. For example, it may also be arranged at the core outlet.

Further, when the power of the core rises, the temperature of the coolant which flows through the inside of the core rises. When the power of the core falls, the temperature of the coolant which flows through the inside of the core falls. The coolant proceeds from the core inlet toward the core outlet through a channel in the core. When the coolant proceeds through the channels, heat is transferred from the fuel members. For this reason, when the power of the core changes, the amount of change of the coolant temperature at the inlet of the core is small. The amount of change of the coolant temperature becomes larger the more toward the outlet of the core. For example, when the power of the core rises, the extent of change of the coolant temperature becomes smallest at the inlet of the core and becomes largest at the outlet of the core. For this reason, referring to FIG. 9, from another viewpoint, at the core 10, it is possible to set a low change region 133 where the extent of change of the coolant temperature becomes smaller when the power changes and a high change region 134 where the extent of change of the coolant temperature becomes larger than the low change region.

The low change region 133 in the present embodiment becomes a region which is arranged at the upstream side from the high change region 134. By arranging the gap adjusting member in the high change region 134, it is possible to increase the amount of deformation of the gap adjusting member when the power of the core changes. Further, when the positions of the bottom ends of the fuel members are fixed, by arranging the gap adjusting member in the low change region 133, it is possible to increase the amount of movement of the top ends of the fuel members. That is, even if the amount of deformation of the gap adjusting members is small, the distance between the bottom ends of the fuel members and the gap adjusting member is small, so the amount of deformation of the distance between fuel members can be increased.

In the core in the present embodiment, the bottom ends of the fuel assemblies are fastened by the assembly bottom end support member, but the invention is not limited to this. The bottom ends of the fuel assemblies may also be supported to be able to move in the radial direction like the top ends of the fuel assemblies. For example, the assembly bottom end support member may also be formed so as to expand by heat according to the temperature of the coolant. The assembly bottom end support members which are arranged at the bottom ends of the fuel assemblies may also be formed by materials similar to the gap adjusting members.

In the present embodiment, the fuel members which are adjusted in distance by the gap adjusting member include fuel assemblies, but the invention is not limited to this. Fuel rods may also be employed as fuel members. The fuel rods need not be bundled to form fuel assemblies. The fuel rods may also be supported directly by the gap adjusting member so that the channels of the coolant are secured. Further, the gap adjusting member in the present embodiment is formed so as to support all of the fuel members among the plurality of fuel members which are contained in the core, but the invention is not limited to this. It is also possible that it be formed so as support part of the fuel members.

The gap adjusting member in the present embodiment includes a gap adjusting plate which is formed in a plate shape, but the invention is not limited to this. The gap adjusting member may be any which is formed so as to adjust the distance between adjoining fuel members in accordance with the temperature. For example, the gap adjusting member may include wires or other members formed into wire shapes. Alternatively, the gap adjusting member may also be block shaped members which are attached to the fuel assemblies and expand with heat. For example, the gap adjusting member may include block shaped members which are attached to the outer surfaces of the support grids, and the fuel assemblies may be formed so that when loaded into the core, the block shaped members of the adjoining fuel assemblies contact each other.

Further, in the present embodiment, the gap adjusting plate was arranged at a position of one location in the axial direction of the core, but the invention is not limited to this. The gap adjusting member may also be arranged at a plurality of positions.

In the present embodiment, the power of the core 10 is adjusted by performing control to change the temperature of the coolant which flows through the inside of the core in accordance with the change in the power demanded for the core 10. The nuclear reactor 1 in the present embodiment can apply a large absolute value reactivity when the temperature of the coolant which flows through the inside of the core 10 changes. The nuclear reactor 1 in the present embodiment adjusts the power of the core by performing the coolant temperature adjustment control in which the temperature of the coolant which flows into the core 10 is changed. In the core 10 of the present embodiment, the temperature coefficient relating to the coolant is a negative value which has a large absolute value. For this reason, by raising the temperature of the coolant which flows into the core 10, it is possible to apply the negative reactivity which has a large absolute value to the core 10 and lower the power of the core 10. Alternatively, by lowering the temperature of the coolant which flows into the core 10, it is possible to apply a large positive reactivity to the core 10 and raise the power of the core 10. In particular, in the present embodiment, it is possible to not only finely adjust the power of the core to several %, but also, for example, roughly adjust the power of the core by several tens of %.

In the present embodiment, to change the temperature of the coolant which flows into the core 10, control is performed to change the load of the apparatus which is connected to the nuclear reactor. Referring to FIG. 1, in the power generating facility in the present embodiment, control is performed to change the generated electric power.

For example, when raising the temperature of the coolant which flows into the core 10, the generated electric power is made smaller to reduce the load. By reducing the opening degree of the flow regulating valve 44, the steam flow rate which is supplied to the turbine 4 becomes smaller and the generated electric power becomes smaller. The amount of heat exchanged at the steam generator 3 becomes smaller. The temperature of the secondary system sodium 52 which circulates through the intermediate heat exchanger 2 and the steam generator 3 rises. By the rise of the temperature of the secondary system sodium 52, the temperature of the primary system sodium 51 (coolant) which flows out from the intermediate heat exchanger 2 also rises. The temperature of the coolant which flows into the core 10 rises and the temperature of the coolant which flows through the inside of the core 10 rises. Alternatively, the core outlet becomes higher in temperature of the coolant than the core inlet, but the average temperature of the coolant in the core rises. As the average temperature of the coolant, the temperature of the coolant which is averaged in the direction of the core axis may be mentioned. At the core 10, the temperature coefficient relating to the coolant is a negative value, so if the temperature of the coolant rises, the core 10 is given a negative reactivity. As a result, the power of the core 10 can be lowered.

Further, when lowering the temperature of the coolant which flows into the core 10, the generated electric power is increased to increase the load. By increasing the opening degree of the flow regulating valve 44, the flow rate of the steam which is supplied to the turbine 4 increases and the generated electric power increases. The amount of heat which is exchanged at the steam generator 3 becomes greater. For this reason, the secondary system sodium 52 and primary system sodium 51 (coolant) fall in temperature. The coolant which flows into the core 10 falls in temperature and a positive reactivity is applied to the core 10. As a result, the power of the core 10 can be raised.

In this way, in the present embodiment, by reducing the amount of heat which the apparatus which is connected to the nuclear reactor 1 consumes, it is possible to raise the temperature of the coolant which flows into the core 10 and lower the power of the core 10. Further, by increasing the amount of heat which the apparatus which is connected to the nuclear reactor 1 consumes, it is possible to lower the temperature of the coolant which flows into the core 10 and raise the power of the core 10.

In this way, the nuclear reactor in the present embodiment can change the power of the core even without using control rods. Note that, the nuclear reactor is not limited to this. Control rods may be used to adjust the reactivity at the same time.

In the present embodiment, the flow rate of the steam which is supplied to the turbine is adjusted to change the temperature of the coolant which flows into the core, but the invention is not limited to this. It is possible to employ any apparatus which can adjust the temperature of the coolant which is supplied to the nuclear reactor. For example, referring to FIG. 1, a heat exchanger etc. may be arranged to adjust the temperature of the heat medium at the channel of at least one of the channel for circulation of the primary system sodium 51, the channel for circulation of the secondary system sodium 52, and the channel for circulation of water and steam.

Figure 12:
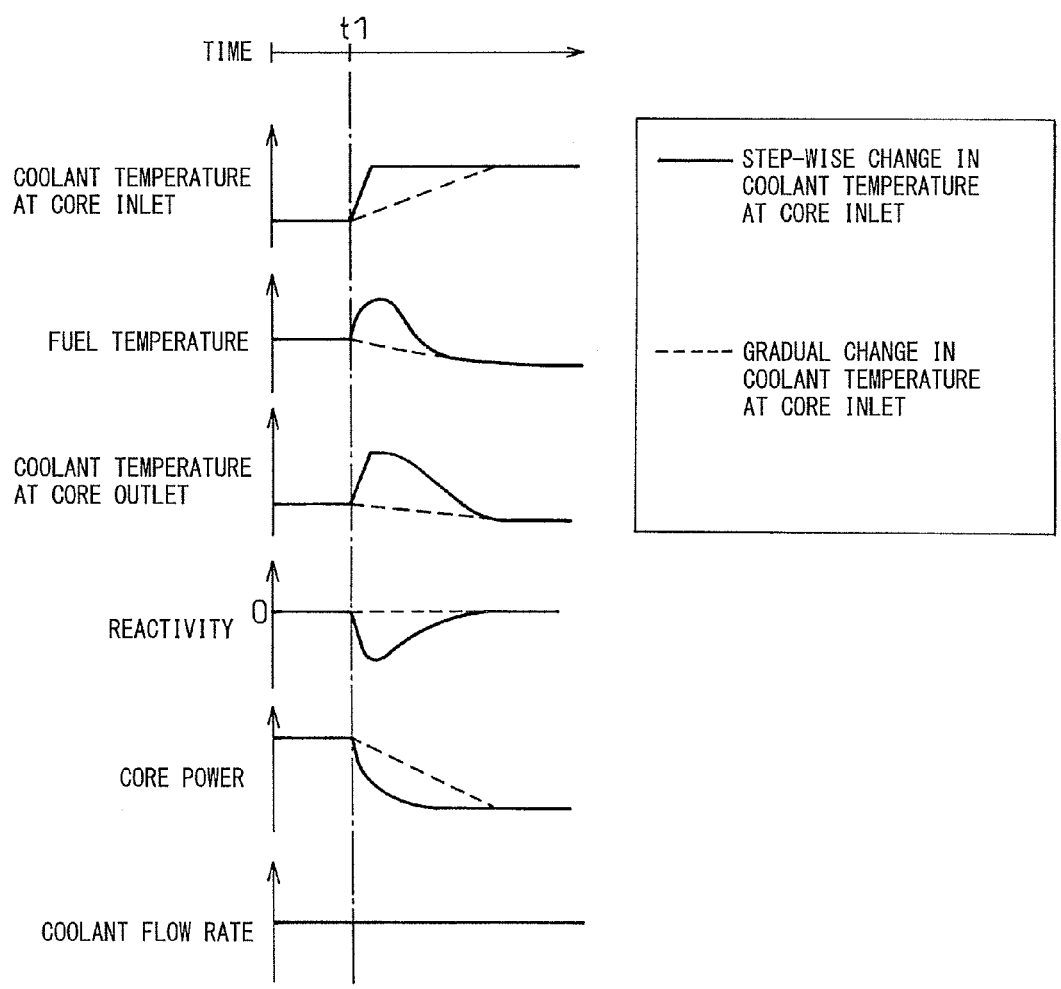
FIG. 12 is a time chart of coolant temperature adjustment control in the Embodiment 1.

FIG. 12 is a time chart of the coolant temperature adjustment control in the present embodiment. FIG. 12 illustrates the control for lowering the power of the core. The nuclear reactor in the present embodiment is operated so that in ordinary operational control, the power of the core becomes substantially constant.

FIG. 12 shows the case of raising the coolant temperature at the core inlet in steps by the solid lines. Up to the time t1, the reactor operates steadily. Further, the flow rate of the coolant which flows into the core is held substantially constant even during the period of change of the power of the core.

At the time t1, control is performed to reduce the generated electric power. The coolant temperature at the core inlet rises in steps. The fuel temperature and the coolant temperature at the core outlet rise along with the rise of the coolant temperature at the core inlet. The temperature of the fuel gradually rises from the core inlet toward the core outlet along with the rise of the temperature of the coolant, but the fuel temperature which is shown in FIG. 12 shows the average temperature in the core 10. As the average temperature of the fuel, it is possible to illustrate the value of the fuel temperature averaged in the direction of the core axis in the same way as the average temperature of the coolant.

The coolant temperature at the core inlet rises, so the average temperature of the coolant in the core rises. In the core in the present embodiment, the temperature coefficient relating to the coolant is a negative value which has a large absolute value, so a negative reactivity is applied to the core. For this reason, the core changes from a state where criticality is maintained to a subcritical state and the power of the core falls.

Along with the fall of the power of the core, the temperature of the fuel which temporarily rose falls and becomes substantially constant at a predetermined temperature. Further, along with a drop in the power of the core, the coolant temperature at the core outlet which temporarily rose also falls and becomes substantially constant at a predetermined temperature. The reactivity which is given to the core temporarily falls, but becomes substantially zero along with the drop in temperature of the coolant outlet and the fuel temperature. That is, the core returns from the subcritical state to the critical state. In the state where the power of the core falls, the critical state is again shifted to. In this way, by raising the cooling temperature at the core inlet, the power of the core can be reduced.

FIG. 12 illustrates the case where the coolant temperature at the core inlet is gradually raised by broken lines. To gradually raise the coolant temperature at the core inlet, for example, it is possible to gradually lower the generated electric power. When gradually raising the coolant temperature at the core inlet, the power of the core can be made to gradually fall. The reactivity which is applied to the core continues to be substantially constant in state. That is, the core can be maintained in the substantially critical state while changing the power of the core. The fuel temperature and the coolant temperature at the core outlet also do not rapidly change, but gradually change.

In this way, as coolant temperature adjustment control for changing the coolant temperature which flows into the core, it is possible to change the temperature of the coolant which flows into the core in steps or to change it gradually. When raising the power of the core, opposite to the above example of control, it is possible to lower the temperature of the coolant at the core inlet in steps or to lower it gradually.

The reactivity applying mechanism of the present embodiment is formed so that a change in the temperature of the coolant causes the gap adjusting member to expand or contract whereby the temperature coefficient relating to the coolant becomes a large absolute value negative value. The reactivity applying mechanism is not limited to this. Any mechanism to apply reactivity by which the power of the core can be changed may be employed. For example, the reactivity applying mechanism preferably employs a coolant mainly comprised of $^{208}$Pb among the isotopes of lead so as to make the temperature coefficient relating to the coolant a larger absolute value negative value.

Lead is suitable as a coolant of a fast reactor since the scattering cross-section of fast neutrons is large and the capture cross-section is small. Lead has four isotopes: lead 204, lead 206, lead 207, and lead 208. Lead 208 is suitable as a coolant since, even among these isotopes, the capture cross-section of the neutrons becomes smaller than other isotopes of lead. Furthermore, lead 208 can be given a temperature coefficient relating to the coolant more to the negative side value than the other isotopes of lead.

Figure 13:
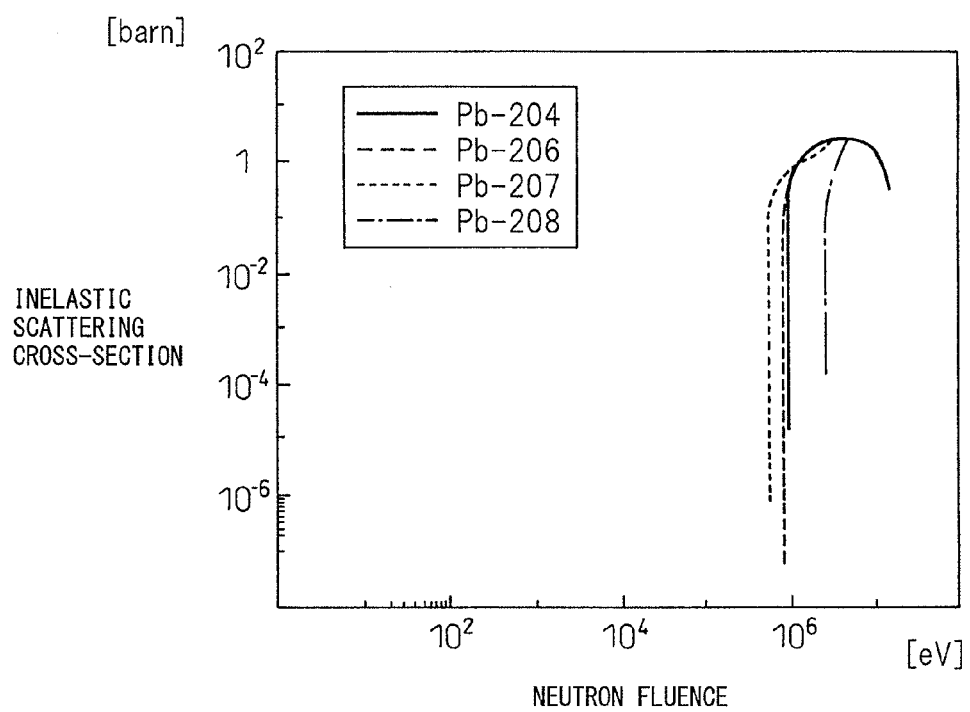
FIG. 13 is a graph of the inelastic scattering cross-sections of isotopes of lead.

FIG. 13 is a graph of the inelastic scattering cross-sections of isotopes of lead. The abscissa and ordinate are shown by log gradations. The inelastic scattering cross-sections of isotopes of lead have predetermined threshold values. For example, lead 204 and lead 206 have threshold values of neutron energies of around $10^6$ eV. If energy of a neutron is higher than these threshold values, the neutron is inelastically scattered and decelerated.

The neutron spectrum of a fast reactor has a peak at a neutron energy slightly lower than $10^6$ eV. For example, when using lead 204 and lead 206 as the coolant, numerous neutrons are inelastically scattered and decelerated by the coolant. For this reason, when the coolant temperature rises and the density of the coolant is reduced, the effect of deceleration by inelastic scattering of neutrons becomes extremely small. The neutron spectrum hardens and the reactivity changes to the positive side.

As opposed to this, when using lead 208 as the coolant, the threshold value of the neutron energy of the inelastic scattering cross-section is high, so the effect of causing inelastic scattering of neutrons is smaller than lead 204 etc. For this reason, even if the temperature of the coolant rises and the density of the coolant is reduced, the action of hardening of the neutron spectrum is smaller than that of lead 204 etc. The action of the reactivity shifting to the positive side is smaller than that of lead 204 etc. For this reason, when using lead 208 as the coolant, compared by using another lead 204 etc. as the coolant, the temperature coefficient relating to the coolant can be made a value more to the negative side.

For this reason, as the coolant, it is preferable to employ a coolant mainly comprised of lead 208 which is raised in content of lead 208 by separation of lead into isotopes etc. Furthermore, substantially all of the lead which is contained in the coolant is preferably lead 208. Due to this configuration, the temperature coefficient relating to the coolant can be made a larger absolute value negative value. Further, the power of the core can be easily changed.

The fuel in the present embodiment was explained with reference to the example of depleted uranium as the new fuel which is charged into the core, but the invention is not limited to this. At least one of natural uranium and depleted uranium may be used to realize CANDLE burning. Alternatively, the present invention can be applied to any fast neutron reactor able to perform CANDLE burning.

In the present embodiment, the burning part of the previous cycle is arranged at the upper side of the new fuel part at the beginning of the operation cycle, but the invention is not limited to this. The new fuel part can be arranged at least at one end of the burning part in the axial direction of the core. Furthermore, the new fuel part may be arranged at the two sides of the burning part.

Further, in the present embodiment, for the part which starts burning at the beginning of the operation cycle, the fuel which is arranged at the bottom of the core at the end of the previous operation cycle is used, but the invention is not limited to this. The part which starts burning at the beginning of the operation cycle need only be formed so that neutrons are emitted in it. For example, fuel which contains a predetermined concentration of plutonium or concentrated uranium etc. may also be arranged. Furthermore, the burning may be started by neutrons being supplied from the outside as well.

Further, the core in the present embodiment is arranged with the axial direction of the core parallel to the vertical direction, but the invention is not limited to this. The axial direction of the core may also be parallel to the horizontal direction. That is, the core in the present embodiment may also be arranged horizontally.

In the present embodiment, the explanation was given with reference to the example of a core of a nuclear reactor which is used for a power generating facility, but the invention is not limited to this. The present invention can be applied to the nuclear reactor of any facility. For example, the nuclear reactor of the present invention can be used as the power source of a ship etc.

Embodiment 2

Figure 14:
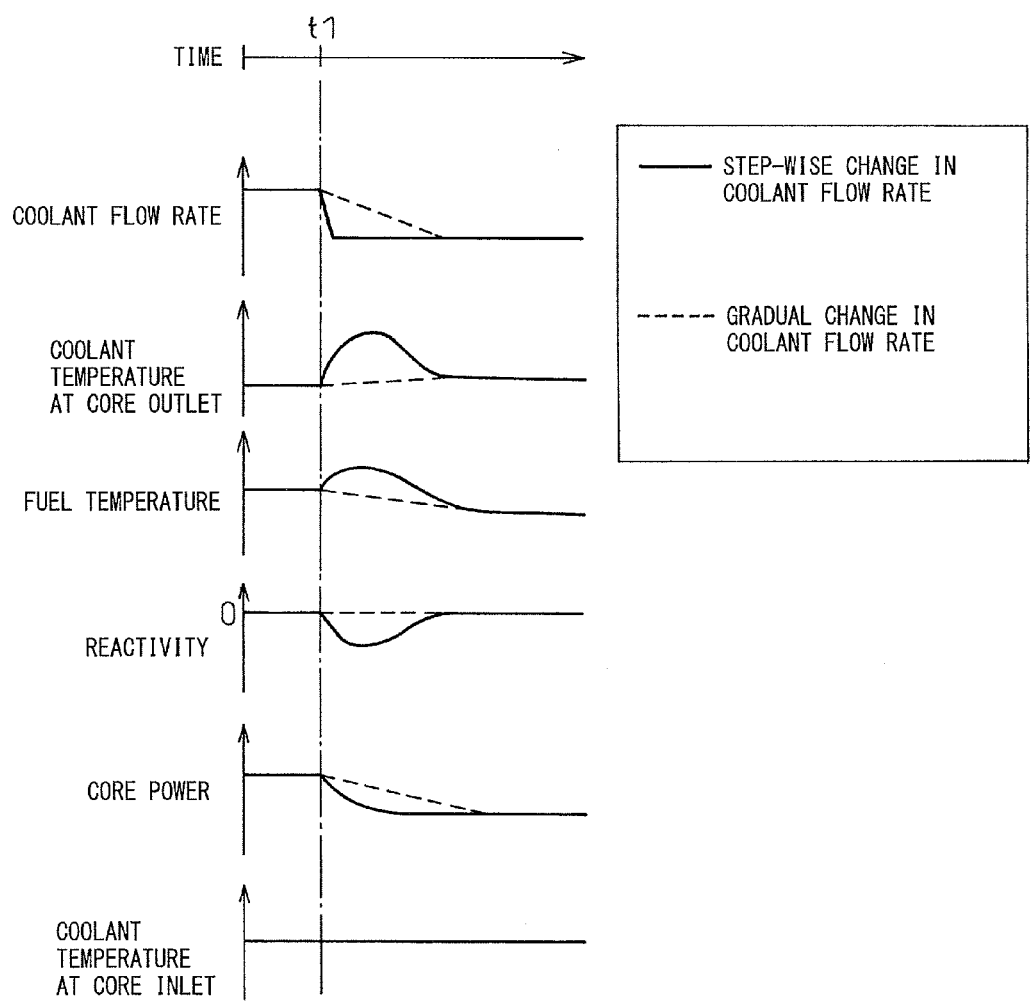
FIG. 14 is a time chart of coolant temperature adjustment control in the Embodiment 2.

Referring to FIG. 14, the nuclear reactor and power generating facility in the Embodiment 2 will be explained. The structures of the nuclear reactor and power generating facility in the present embodiment are similar to the Embodiment 1. In the present embodiment, the reactivity which is applied to the core is changed and the power of the core is changed by performing a coolant flow rate adjustment control in which the flow rate of the coolant which flows into the core is changed. In the present embodiment as well, in the same way as the Embodiment 1, control is performed to change the temperature of the coolant which flows through the inside of the core in accordance with the change in the power which is demanded for the core. In the present embodiment, the flow rate of the coolant which flows into the core is changed to change the temperature of the coolant which flows through the inside of the core.

Referring to FIG. 1, when the temperature of the coolant which flows into the core 10 is constant, it is possible to change the flow rate of the coolant which flows into the core 10 so as to change the temperature of the coolant at the core outlet. In this case, the average temperature of the coolant in the core 10 changes. For example, the value of the temperature of the coolant which is averaged in the axial direction of the core from the core inlet to the core outlet changes. As a result, it is possible to give a positive or negative reactivity to the core 10.

For example, by reducing the flow rate of the coolant which flows into the core 10, it is possible to raise the coolant temperature in the core 10. The core of the nuclear reactor in the present embodiment has a negative temperature coefficient relating to the coolant which has a large absolute value, so by raising the coolant temperature inside of the core 10, it is possible to apply a negative reactivity to the core 10. As a result, it is possible to lower the output of the core 10. Further, by increasing the flow rate of the coolant which flows into the core 10, it is possible to give a positive reactivity to the core 10 and possible to raise the power of the core 10.

In the present embodiment, by changing the output of the pump 41 which supplies coolant to the core 10, the flow rate of the coolant which flows into the core 10 is changed. Further, in the present embodiment, the load which is connected to the nuclear reactor is adjusted so that even if changing the flow rate of the coolant which flows into the core 10, the temperature of the coolant which flows into the core 10 becomes substantially constant. That is, the generated electric power is adjusted.

FIG. 14 is a time chart of the coolant flow rate adjustment control in the present embodiment. FIG. 14 illustrates control for reducing the power of the core. FIG. 14 describes the case of changing the flow rate of the coolant which flows into the core in steps by solid lines. Up to the time t1, a steady operation is performed.

At the time t1, the flow rate of the coolant which flows into the core 10 is reduced in steps. The coolant temperature at the core outlet temporarily rises since the flow rate of the coolant which flows through the inside of the core 10 is reduced. The average temperature of the coolant inside the core also rises. The fuel temperature temporarily rises along with the rise of average temperature of the coolant. The fuel temperature which is shown in FIG. 14 shows the average temperature inside the core.

In the core 10 in the present embodiment, the temperature coefficient relating to the coolant is a negative value which has a large absolute value, so the core 10 is applied a negative reactivity and the power of the core 10 falls. Along with the drop in output of the core 10, the coolant temperature and fuel temperature at the core outlet fall and the temperatures become substantially constant. The reactivity shifts to the positive side along with the drop in coolant temperature and the drop in the fuel temperature in the core and becomes substantially zero. That is, the core temporarily becomes a subcritical state, then returns to the critical state. The power of the core falls from the time t1 and becomes substantially constant at a predetermined power.

In this way, the core of the nuclear reactor in the present embodiment can be reduced in the power of the core by reducing the flow rate of the coolant which is supplied to the core.

FIG. 14 shows the case of gradually changing the flow rate of the coolant by the broken lines. When gradually changing the flow rate of the coolant, the reactivity of the core is held at a substantially zero value. It is possible to keep the core at a substantially critical state while lowering the power of the core. By gradually changing the coolant flow rate, the coolant temperature and fuel temperature at the core outlet are gradually changed. In this way, even if gradually changing the flow rate of the coolant which flows into the core, the power of the core can be changed.

When raising the power of the core, in the opposite manner as the above example of control, it is possible to increase the flow rate of the coolant which flows into the core in steps or gradually increase it.

In the present embodiment, the output of the pump which supplies coolant to the core is changed to change the flow rate of the coolant which flows into the core, but the invention is not limited to this. Any mechanism can be used to change the flow rate of the coolant which flows into the core. For example, it is possible to arrange an apparatus which adjusts the flow rate of the coolant at the inside of the reactor vessel or arrange an apparatus which adjusts the flow rate of the coolant at the end of the fuel assemblies.

The rest of the configuration, action, effects, etc. are similar to those of Embodiment 1, so the explanations will not be repeated here.

The control for adjustment of the coolant temperature of the Embodiment 1 and the control for adjustment of the coolant flow rate of the Embodiment 2 can be combined. For example, control for adjustment of the coolant flow rate can be performed as main control to change the power of the core during which auxiliary control comprised of control for adjustment of the coolant flow rate is performed.

In the above figures, the same or corresponding parts are assigned the same reference numerals. Note that, the above embodiments are illustrations and do not limit the invention. Further, in the embodiments, changes included in the claims are intended.

REFERENCE NOTATIONS LIST 1 nuclear reactor
2 intermediate heat exchanger
3 steam generator
4 turbine
5 generator
6 condenser
10 core
11 new fuel part
12 burning part
13 burned up part
21 fuel assembly
22 fuel rod
25a, 25b support grids
31 gap adjusting plate
32 assembly bottom end support member
33 assembly top end support member
41 to 43 the pump
44 flow regulating valve
51, 52 sodium

The invention claimed is:

1. A nuclear reactor, comprising:
a core including, along an axial direction of the core, new fuel and burning fuel,
the burning fuel being arranged, in said axial direction, at only one side of the new fuel,
the burning fuel generating neutrons to enable fuel to burn,
the new fuel including at least one type of uranium from among natural uranium and depleted uranium, the uranium absorbing neutrons to generate plutonium which fissions to generate power, and
the burning fuel growing at one end in said axial direction toward the new fuel while diminishing into burned up fuel at an opposite end in order to maintain a substantially constant shape from a beginning to an end of an operation cycle; and
a reactivity applying mechanism configured to apply reactivity to change the power of the core when a temperature of coolant which flows through an inside of the core changes,
wherein
the power of the core is adjusted by performing control to change the temperature of the coolant which flows through the inside of the core,
the reactivity applying mechanism includes
fuel members which include fuel rods or fuel assemblies, and
a gap adjusting member arranged in a region which is included in the burning fuel at the beginning of the operation cycle,
the gap adjusting member supports the fuel members together, and determines a distance between the fuel members,
the gap adjusting member is formed by a material which expands when the temperature rises,
the gap adjusting member expands and the distance between the fuel members becomes larger when the temperature of the coolant in the core rises, and
the gap adjusting member includes a gap adjusting plate which has holes, and the fuel members are supported in the holes.

2. The nuclear reactor as set forth in claim 1, wherein the core has
a high rise rate region where the temperature of the coolant rises from a core inlet toward a core outlet, and
a low rise rate region which is arranged downstream from the high rise rate region and has a smaller rate of rise of temperature than the high rise rate region, and
the gap adjusting member is arranged in the low rise rate region at the beginning of the operation cycle.

3. The nuclear reactor as set forth in claim 1, wherein the reactor changes the temperature of the coolant which flows inside the core by performing a coolant temperature adjustment control which makes the temperature of the coolant which flows into the core change.

4. The nuclear reactor as set forth in claim 1, wherein
the reactor is formed so that when a flow rate of the coolant which flows into the core changes, the temperature of the coolant which flows through the inside of the core changes to apply the reactivity to change the power of the core, and
the reactor changes the temperature of the coolant which flows inside the core by performing a coolant flow rate adjustment control which makes the flow rate of the coolant which flows into the core change.

5. The nuclear reactor as set forth in claim 1, wherein the coolant is mainly comprised of lead 208 among isotopes of lead.

6. A power generating facility, comprising:
a nuclear reactor, the nuclear reactor comprising a core and a reactivity applying mechanism,
a steam generator which generates steam by heat which is generated by the core,
a turbine which turns by supply of steam which is produced by the steam generator, and
a generator which is connected to the turbine,
the core including, along an axial direction of the core, new fuel and burning fuel,
the burning fuel being arranged, in said axial direction, at only one side of the new fuel,
the burning fuel generating neutrons to enable fuel to burn,
the new fuel including at least one type of uranium from among natural uranium and depleted uranium, the uranium absorbing neutrons to generate plutonium which fissions to generate power,
the burning fuel growing at one end in said axial direction toward the new fuel while diminishing into burned up fuel at an opposite end in order to maintain a substantially constant shape from a beginning to an end of an operation cycle,
the reactivity applying mechanism configured to apply reactivity to change the power of the core when a temperature of coolant which flows through an inside of the core changes,
wherein
the power of the core is adjusted by performing control to change the temperature of the coolant which flows through the inside of the core,
the reactivity applying mechanism includes
fuel members which include fuel rods or fuel assemblies, and a gap adjusting member arranged in a region which is included in the burning fuel at the beginning of the operation cycle, the gap adjusting member supports the fuel members together, and determines a distance between the fuel members, the gap adjusting member is formed by a material which expands when the temperature rises, the gap adjusting member expands and the distance between the fuel members becomes larger when the temperature of the coolant in the core rises, and the gap adjusting member includes a gap adjusting plate which has holes, and the fuel members are supported in the holes.

* * * * *